United States Patent [19]

Moss et al.

[11] Patent Number: 4,613,006
[45] Date of Patent: Sep. 23, 1986

[54] ENDLESS BELT DRIVEN CYCLE

[76] Inventors: Alvin Moss, 3 Gushue Avenue, New Town, Mount Pearl, Newfoundland, A1N 2R2; Charles G. Shepherd, P.O. Box 46, Oakville, Ontario, L6J 4Z5; Craig G. Malcolm, 46 Autumn Drive, Caleson, Ontario L0N 1C0; Richard E. Malcolm, 432 Drummond Road, Oakville, Ontario L6J 4L4; Peter J. Schmitz, 1547 Stavebank Road, Mississauga, Ontario L5G 2V6, all of Canada

[21] Appl. No.: 577,399

[22] Filed: Feb. 6, 1984

[51] Int. Cl.⁴ .............................................. B62D 55/06
[52] U.S. Cl. .................................. 180/9.25; 180/184; 180/190; 305/35 EB; 305/46
[58] Field of Search ............... 180/190, 191, 184, 185, 180/9.1, 9.21, 9.25, 9.26; 280/13, 28, 609, 28.5, 11.1 ET; 193/688, 698, 699; 305/35 EB, 46

[56] References Cited

U.S. PATENT DOCUMENTS

| | | | |
|---|---|---|---|
| 3,318,403 | 5/1967 | Hansen | 305/35 EB |
| 3,318,407 | 5/1967 | Deardorff | 180/9.25 |
| 3,664,446 | 5/1972 | Burtis | 180/9.25 |
| 3,671,051 | 6/1972 | Werft | 305/35 EB |
| 4,108,453 | 8/1978 | Lavalier | 280/28 |
| 4,221,272 | 9/1980 | Kell | 180/190 |
| 4,244,436 | 1/1981 | Condon | 180/191 |
| 4,286,682 | 9/1981 | Stewart | 180/190 |
| 4,434,867 | 3/1984 | Grinde | 180/190 |
| 4,452,496 | 6/1984 | van der Lely | 180/9.26 |

Primary Examiner—John J. Love
Assistant Examiner—Everett G. Diederiks, Jr.
Attorney, Agent, or Firm—Hirons, Rogers & Scott

[57] ABSTRACT

A ground support vehicle has a rear drive track. Cleats extending transversely of the outer surface of the track are outwardly curved to facilitate leaning of the vehicle and its rider as the vehicle travels around a curve. In a preferred embodiment the vehicle includes a ski mounted on front forks so that the vehicle can be used for recreational purposes in snow or directly on unpaved ground and tracks. A wheel can be fitted in place of the ski if desired.

8 Claims, 7 Drawing Figures

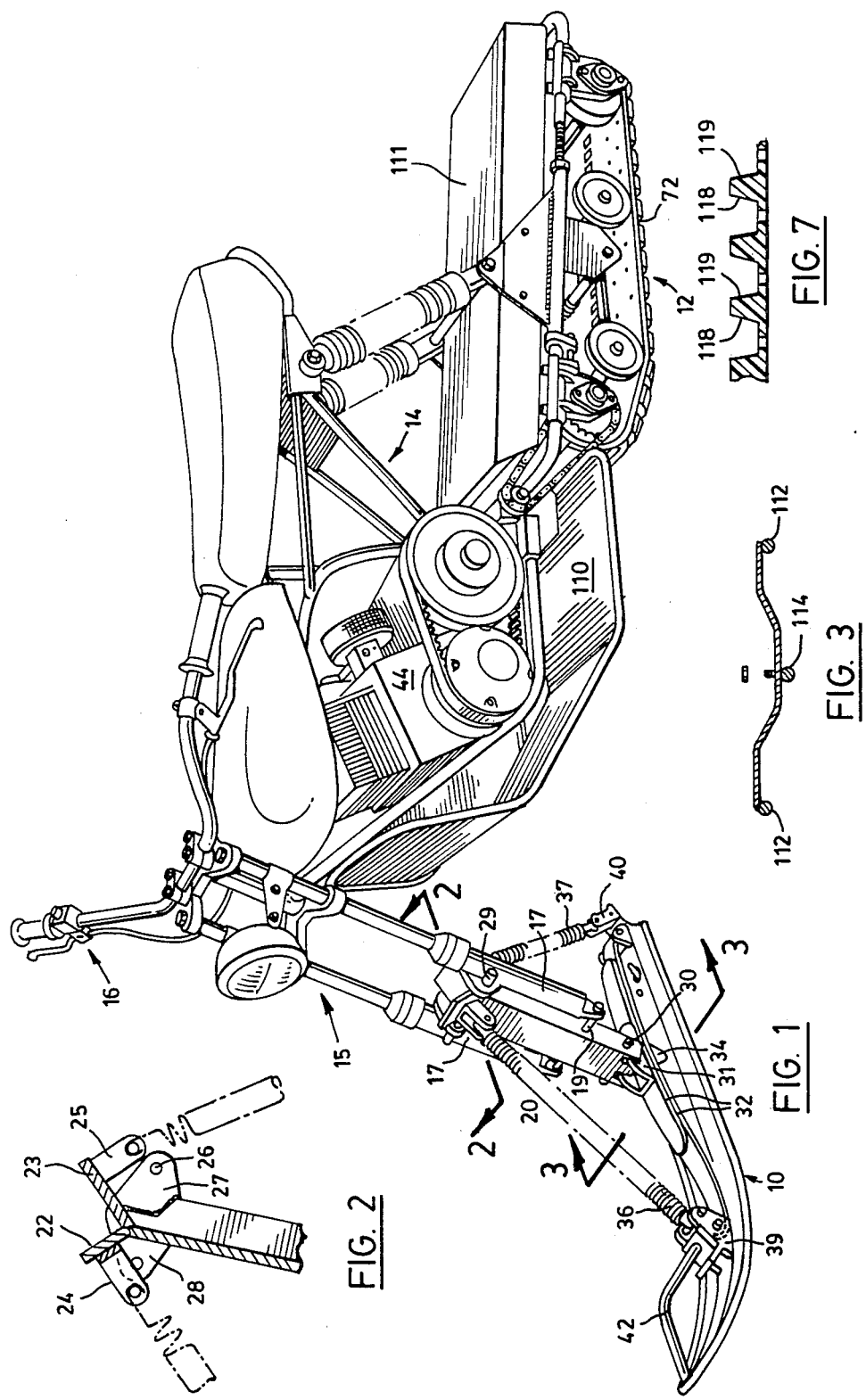

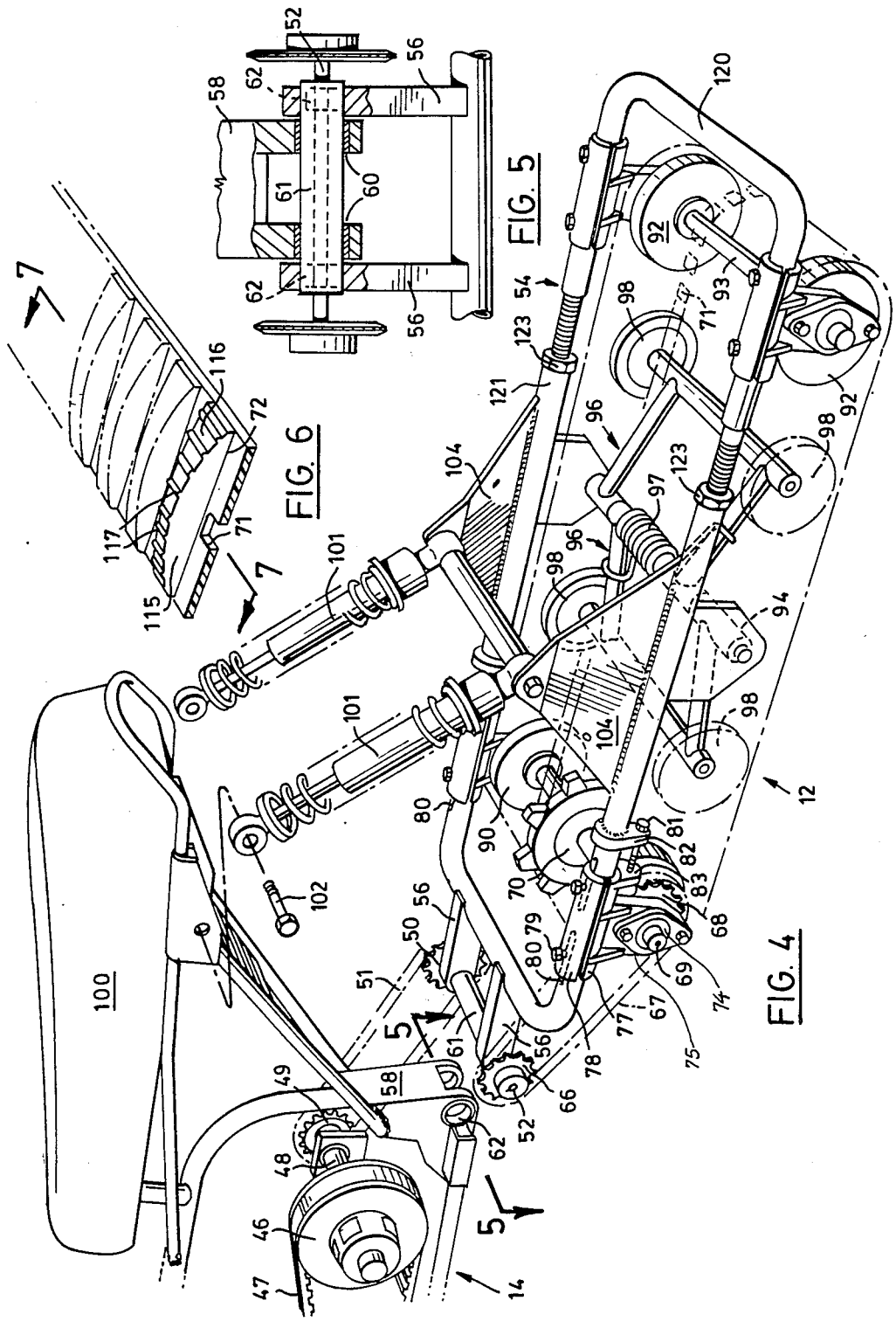

ENDLESS BELT DRIVEN CYCLE

The present invention relates to ground support vehicles of the type used mainly for recreational use, and more particularly to such a vehicle having a driven rear track.

Vehicles have been designed for use on snow and others for use on unpaved ground and trails. Although some attempts have been made to provide conversions so that a common power source and basic frame can be used on both vehicles, none has been successful both because of the complexity of the conversion but also because of the cost. A further factor for some purchasers is that vehicles capable of such conversion are not particularly good in at least one of these modes, again due in part to the conversion.

Attempts have also been made to provide off-road vehicles which are capable of use on rough terrain and which will also carry the user over snow. Typically such vehicles have three bulbous wheels with a single wheel at the front. While they will perform adequately in light snow, they lack directional stability and are consequently of limited use.

The present invention provides a novel form of vehicle designed to be used both on snow and on unpaved ground. The vehicle can be directed by a single ski or by a wheel as desired. By contrast with prior art known to the applicant, the drive system can be used very successfully in many different environments including snow, mud, sand, etc. The vehicle handles like a motorcycle in all conditions and yet has distinctive characteristics making it a unique machine for recreational use. This is achieved by providing the drive system with an improved track having transverse cleats, the peripheries of which are curved convexly across the width of the track. The cleats are carried on a flat belt running on rollers. Preferably a leading portion of the underside of the track is inclined upwardly and forwards.

These and other aspects of the invention will be described with reference to the following drawings in which:

FIG. 1 is a perspective view looking generally from the front and side of a preferred embodiment of a ground support vehicle embodying the present invention;

FIG. 2 is a cross-sectional view on line 2—2 of FIG. 1 and showing parts of the vehicle;

FIG. 3 is a cross-sectional view on line 3—3 of FIG. 1 showing a ski forming part of the vehicle;

FIG. 4 is an exploded perspective view looking generally from the rear and side and showing the track support and drive arrangement of the vehicle;

FIG. 5 is a sectional view on line 5—5 of FIG. 4;

FIG. 6 is a perspective view of a section of track used in the vehicle; and

FIG. 7 is a sectional view on line 7—7 of FIG. 6.

Reference is made firstly to FIG. 1 which illustrates a vehicle having a frame 14 carrying a prime mover, a drive track assembly 12 coupled to the frame such that the prime mover can drive the assembly to propel the vehicle. At its forward end the frame is coupled to a conventional arrangement of motorcycle forks 15 carrying a ski 10 for directing the vehicle over some surfaces as will be described.

The front fork 15 has handle bars 16 and a pair of shock dampers 17. As is conventional with such forks, it is pivotable relative to the vehicle frame 14 and is used in this vehicle to turn the ski 10 when steering the vehicle.

The shock dampers 17 are secured at their lower ends to a pair of studs 19 projecting laterally from opposite sides of a channel member 20 which, as can be seen from FIG. 2, is provided at its upper end with a welded structure comprising a pair of metal plates extending at approximately right angles to one another. A pair of brackets 24 and 25 are secured to the outer faces of the plates 22 and 23 and a pair of side plates 27 28 are provided with a pair of bolt holes 26 and welded to opposite sides of the channel member 20. The shock dampers 17 are secured to the plates 27 28 by bolts 29 extending through the holes 26.

Returning to FIG. 1, the lower end of the channel member 20 is secured by a pivot pin 30 to a bracket 31 mounted on leaf springs 32 on the ski 10, and a rubber bumper 34 is secured to the underside of the leaf springs 32 to provide some shock absorption.

The brackets 24 and 25 (FIG. 2) retain respective ends of helical tension springs 36 and 37 which are also anchored at brackets 39 and 40. The bracket 39 is mounted on the ski 10 at the front end of the leaf springs 32 and the bracket 40 is secured to the rear end of the ski.

A bar 42 between the bracket 39 and the tip of the ski provides a handle for manipulation of the front end of the vehicle and also reinforces the toe of the ski.

Reference is next made to FIG. 4. An internal combustion engine 44 is mounted on the vehicle frame 14 and drives a clutch 46 through a drive belt 47. Clutch 46 has an output shaft 48 which, through a pair of sprockets 49 and 50 and a drive chain 51, drives a cross-shaft 52 forming part of the drive track assembly 12.

As also seen in FIG. 4, the drive track assembly 12 includes a generally horizontal, rectangular frame 54 which is secured to the vehicle frame 14 for pivoting vertically about its forward end. More particularly, a pair of forwardly projecting arms 56 are welded to the front end of the horizontal rectangular frame 54 for receiving therebetween a bracket 58 forming part of the vehicle frame 14. As better seen in FIG. 5, this bracket carries bushings 60 for rotation on a sleeve 61 which in turn is mounted in the arms 56. This sleeve carries bearings 62 which provide rotation for the cross-shaft 52 carrying sprockets 50 and 66. The sprocket 66 is connected by a drive chain 67 to a lower sprocket 68 on a shaft 69. This shaft is also attached at its midpoint to a track drive sprocket 70 adapted to engage in holes 71 formed in an endless belt 72 (FIG. 1) which in use is in contact with the support surface to drive the vehicle.

The shaft 69 at the forward end of the drive track assembly is journalled in bearings 74, of which only one can be seen in FIG. 4. These bearings are retained by plates 75 depending downwardly from integral lower shells 77 which are shaped to fit against the underside of frame 54. Upper shells 78 also fit against the frame and bolts 79 provide clamping engagement with the horizontal frame 54, which is formed with longitudinal slots 80 to provide fore and aft adjustment fit tensioning the drive chain 67. To this end adjustment bolt 81 is captured in a lug 82 welded to the frame 54 and is threadably engaged in a lug 83 depending from the lower shell 77.

A pair of front idler rollers 90 on the shaft 69 guide the endless belt 72 at the front end of the frame 54, and a pair of rear idler rollers 92 guide the endless belt 72 at the rear end of the frame 54. The rollers 92 are mounted on a shaft 93 which is rotatably secured to the frame 54 in a manner similar to that in which the shaft 69 is secured, and which will therefore not be described in detail except to say that the shaft 93 is not adjustable on the frame 54.

A pair of plates 94 depending from the underside of the horizontal frame 54 carry a shaft (not shown) on which a pair of roller assemblies indicated generally by reference numerals 96 are pivotally mounted and are biased downwardly by means of a spring 97 to urge rollers 98 against the upper surface of the lower run of the endless belt 72. This gives the belt an upward incline between the roller assembly 96 and the rollers 90 as will be explained.

A saddle 100 is mounted at the rear end of the vehicle frame 14, and a pair of shock dampers 101 are pivotally connected to the vehicle frame 14 by pivot bolts 102 and to the horizontal frame 54 through a pair of plates 104 projecting upwardly from opposite sides of the horizontal frame 54 to damp the pivotal movement of the track assembly 12 relative to the vehicle frame 14 about the pivot bolts 102.

A metal plate 110 (FIG. 1) is secured beneath the vehicle frame 14 and the engine 44 for deflecting snow, ice, mud and the like from the engine 44 and from the rider of the vehicle, and a casing 111 is mounted on the top of the drive track assembly 12 for covering the top of the drive track.

As will be readily apparent from the drawings, the vehicle illustrated in the drawings is intended to be ridden somewhat in the manner of a motorcycle and, therefore, the vehicle and the rider will lean sideways when the vehicle travels around a curve. To counteract lateral slippage of the ski 10 when the vehicle and the rider lean sideways in this manner, longitudinal ribs 112 (FIG. 3) in the form of metal rods welded to the underside of the ski 10 are provided beneath the opposite lateral edges of the ski 10, and a central rib 114, also a welded metal rod, extends longitudinally of the underside of the ski 10 and is equispaced from the ribs 112.

To facilitate driving engagement of the drive track 12 with the snow, ice or ground on which the vehicle is travelling, the endless belt 72 is provided with a plurality of cleats 115 (FIG. 6) which are spaced apart along the belt 72 and which each extend transversely the entire width of the belt 72. To facilitate the leaning of the vehicle and its rider, the height of the cleats 115, in a direction perpendicular to the outer surface of the belt 72, increases from opposite edges of the belt 72 to the centre line thereof, so that cleats 115 present an outwardly convex peripheral surface 116. Collectively, and more generally, the cleats on the undersides of the track combine to define a convexly-curved track periphery.

Ribs 117 project outwardly from, and extend transversely of the surface 116 for counteracting lateral slippage of the drive track. Also, as seen in FIG. 7, the cleats have convergent front and rear faces 118, 119 so that as the cleats pass around the front of the track and engage mud or snow, they will take up the FIG. 7 positions as they meet the flattened portions of belt and this action will tend to squeeze the mud and/or snow downwardly, free from the track. The action is of course enhanced by the movement of the cleats as they pass from the inclined forward portion of the track rearwardly to the flat main portion.

Although shown with planar front and rear surfaces, in general these faces will be acceptable provided that their shape and general convergence satisfies the requirements to give a self-chaining action. For this reason the term "convergent faces" is intended to include curved as well as flat faces. The frame 54 is in two parts, namely a rear part 120 and a front part 121 and the two frame parts 120 and 121 are adjustably displaceable relative to one another, by means of adjustment units 123 in threaded engagement with the rear part 120, for relatively displacing the rollers 92 and the rollers 90 longitudinally of the track assembly and thereby adjusting the tension of the track and facilitating changing the belt.

It will be appreciated that the cleats on the track give it a good grip in snow, mud and other soft or loose surfaces. However it has been found that with very little practice a person can drive around curves in such surfaces by banking the vehicle and using the forward drive of the track in combination with the ski to steer. In fact for demonstration purposes, the vehicle has been driven hard in this form on paved surfaces without great difficulty.

The track also includes a forward portion (previously described) on the underside which is inclined upwardly. This also aids stability because as the vehicle moves forwards, the track tends to drive out of the depression it creates in snow or mud thereby tending to free itself rather than to cut further into the snow.

In some conditions where the ground is hard or stony, it may be preferred to make a simple modification by substituting a wheel for the ski to give better directional stability. However it should be appreciated that the ability to bank gives the vehicle good stability when cornering even with the ski on quite hard ground.

Further modifications can be made to the preferred embodiment without departing from the scope of the invention. The track is shown to include cleats which could be attached to a belt or moulded into the belt. However the concept of an endless belt is intended to include such analogous structures as a chain having a short pitch or simply interconnected slats which in cross-section resemble a chain.

We claim:

1. A ground-support vehicle, comprising:
   a vehicle frame having front and rear ends;
   a seat mounted on the frame;
   a ground engagement member supporting a front end of the frame;
   a steering mechanism coupled to front end of the frame for steering the ground engagement member;
   a track assembly including an endless flat drive track having upper and lower runs;
   means coupling the track assembly to the frame and including a horizontal pivotal connection between a forward part of the track assembly and the frame intermediate the front and rear ends of the frame for providing pivotal movement between the track assembly and the frame, the lower run of the track normally being inclined upwardly and forwardly;
   drive means on the frame coupled to the drive track; and
   a plurality of cleats attached to the flat drive track and spaced apart along an outer surface of the drive track, each of the cleats extending transversely of the track and having a height, perpendicular to the outer surface of the track which increases from opposite side edges of the outer surface to the longitudinal centerline of the outer surface so that each of the cleats has a convexly curved outer peripheral surface.

2. A ground-support vehicle as claimed in claim 1, wherein the ground engagement member comprises a ski having at least one downwardly projecting rib extending along the underside of the ski.

3. A ground-support vehicle as claimed in claim 1, wherein the ground engagement member comprises a ski having three downwardly projecting ribs extending along the underside of the ski, two being along respective edges of the ski and the third extending along the center of the ski.

4. A ground-support vehicle as claimed in claim 1, wherein the track assembly includes a frame, support means within the frame and bearing against an inner surface of the frame, the support means including front and rear elements, means securing the support means to the underside of the horizontal frame and means for displacing the rear elements relative to the front elements and thereby adjustably varying the length of the frame for variably tensioning the track.

5. A ground support vehicle as claimed in claim 1 in which each of the cleats further include outwardly converging front and rear faces.

6. A ground support vehicle as claimed in claim 1 in which the lower run of the track further includes a forward portion which is upwardly and forwardly inclined with respect to the remainder of the lower run.

7. A ground support vehicle as claimed in claim 1 in which the coupling means comprises shock damper means including a compression spring for damping pivotal movement of the track assembly.

8. A ground-support vehicle as claimed in claim 1 in which the pivotal connection is about an axis and in which the drive means includes a shaft rotatable about said axis and torque transmitting means supported by said shaft for transmitting drive between the drive means and the track assembly.

* * * * *